J. W. DONATHAN.
AUTOMATIC POULTRY DISINFECTOR.
APPLICATION FILED DEC. 26, 1911.
1,045,129. Patented Nov. 26, 1912.
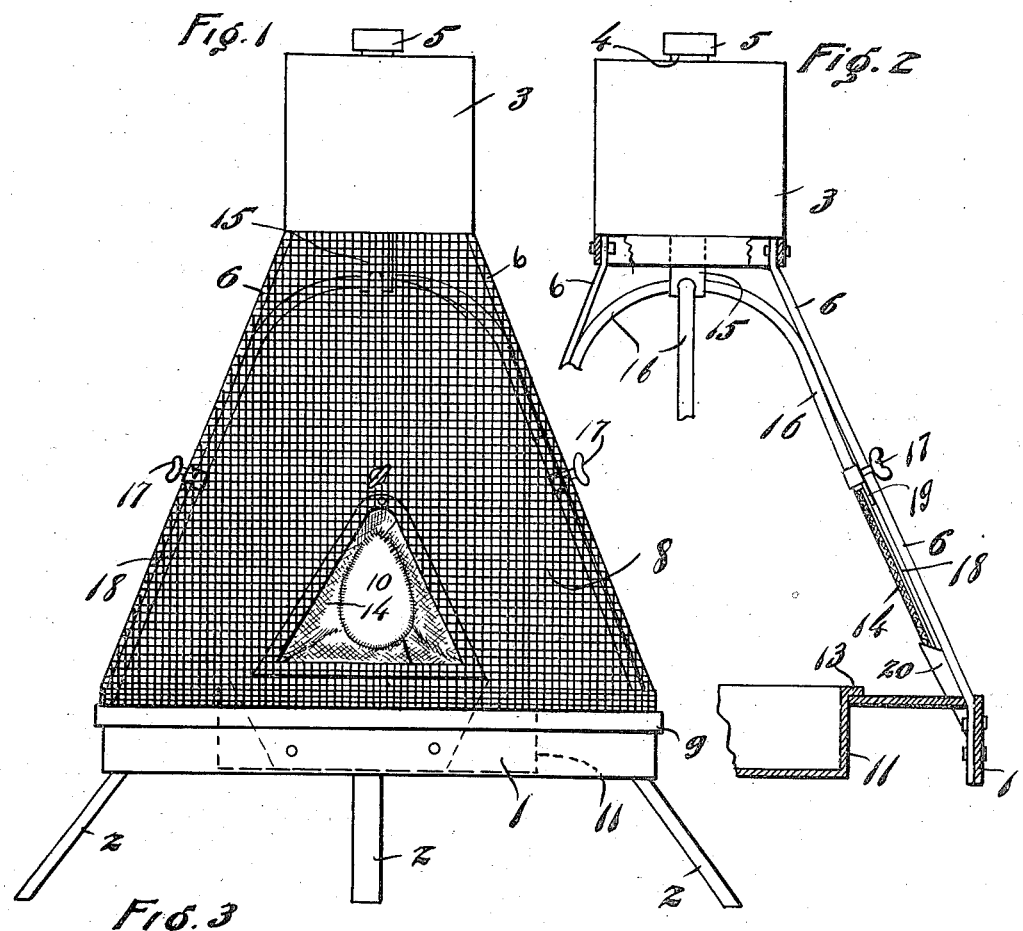
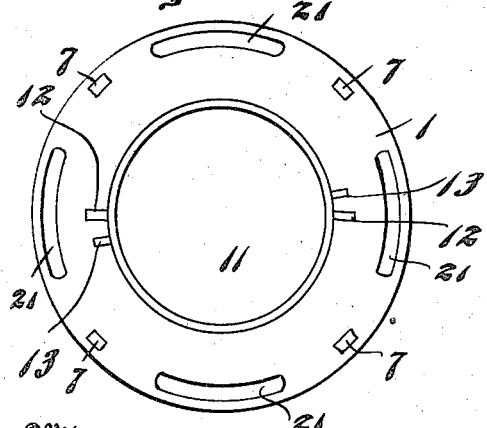
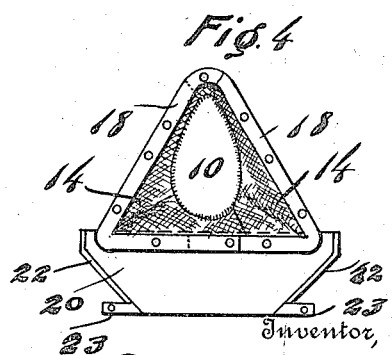

UNITED STATES PATENT OFFICE.

JAMES W. DONATHAN, OF CRESSON, TEXAS.

AUTOMATIC POULTRY-DISINFECTOR.

1,045,129. Specification of Letters Patent. Patented Nov. 26, 1912.

Application filed December 26, 1911. Serial No. 667,759.

*To all whom it may concern:*

Be it known that I, JAMES W. DONATHAN, a citizen of the United States, residing at Cresson, in the county of Hood and State of Texas, have invented certain new and useful Improvements in Automatic Poultry-Disinfectors, of which the following is a specification.

My invention relates to insect destroyers and more particularly to devices for destroying lice and fleas and other vermin from living poultry, and the object is to provide a simple device or devices for distributing a disinfectant on living poultry. It is well known that such vermin attack poultry about the head and neck and it is more difficult for fowls to destroy vermin which lodge about the neck and head than on other parts. The disinfectant is distributed on the necks of the fowls while they are eating. The advantage in this is that the insects are destroyed at the places where the fowls cannot remove them and further the fowls will in efforts to remove insects from other parts of their anatomy distribute the disinfectant to various parts of their anatomy. The fowls are thus made to do their own disinfecting and it has been demonstrated that they do this very effectively.

The object of this invention is to provide apparatus or devices for accomplishing these results.

Other objects and advantages will be fully explained in the following description and the invention will be more particularly pointed out in the claim.

Reference is had to the accompanying drawings which form a part of this application.

Figure 1 is a side elevation of the disinfector. Fig. 2 is a broken sectional view, showing the construction and arrangement of the liquid distributing devices and the arrangement of the food pan. Fig. 3 is a plan view of the base and the food pan. Fig. 4 is a side elevation of one of the liquid distributing devices.

Similar characters of reference are used to indicate the same parts throughout the several views.

This apparatus is provided with a supporting base 1 which may be provided with suitable legs 2. A liquid containing tank 3 is provided and a filling tube or mouth 4 is closed with a cap 5. The tank is supported on braces 6 which may be bolted to the chime of the tank 3. Openings 7 are made in the supporting base 1 and the braces 6 are extended down through the horizontal portion of the base and bolted to the vertical portion on the inside. The inclosure is made by wire screen 8 or other mesh of suitable material. The screen covers the braces and extends from the tank 3 down on the outside of a portion of the base 1 and is secured thereon by a band 9. A food pan 11 is mounted in the base 1. An opening large enough to receive the food pan is made in the base and slots 12 are made in the base in communication with the opening for the food pan 11 and lugs 13 are rigid on the upper edge of the food pan. The pan is mounted from the under side of the base 1 by making the lugs 13 register with the openings 12 and shoving the pan up until the lugs 13 pass through the base and then turning the pan until the lugs 13 rest on top of the base 1. Openings 10 are made for the fowls to put their heads in to get food from the pan 11. There may be any suitable number of openings 10 and the device may be made of any convenient size or shape. The fowls can easily see through the screen to find the food.

Means are provided for distributing liquid on the fowls while they are eating. The openings 10 are made preferably through pieces of cloth 14 and the edges about the openings 10 are frazzled so that the liquid will run from various directions on the necks and heads of the fowls. The tank 3 is provided with a central outlet pipe 15 and a number of small pipes or tubes 16 are connected with the pipe 15. These pipes 16 are provided with cocks 17. The pieces of cloth 14 are carried by frames 18 to which the cloth is attached. The frame pieces 18 are pivotally connected to lugs 19 which project from the ends of the pipes 16 and are rigid with these pipes. The object in making the frame pieces 18 and the cloth 14 in two parts is to make the openings 10 adjustable,—larger or smaller. The lower parts of the frame pieces and the cloth 14 lap on each other and may be connected by screws, as shown. The liquid disinfectant may be turned on the cloth 14 which extends up against the ends of the pipes 16. The amount of liquid discharged can be regulated by the cocks 17. The liquid will saturate the cloths 14 thoroughly so that the liquid will be rubbed on the necks and heads of the fowls. In order to prevent the disinfectant from being mixed in the food, shields or drainers 20 are mounted on the base 1. Slots 21 are made through the horizontal portion of the base and the drainers project through the base and up past the lower sides of the frames 18 and cloths 14. The drainers 20 have flanges 22 on their edges to prevent lateral spread of the liquid and lugs 23 projecting from the lower ends of the flanges 22 are attached to the base 1 by suitable rivets. The liquid may be caught in any suitable drip pan. Food or water may be placed in the pan 11. When the fowls put their heads into casing to get food or water, the liquid disinfectant will be rubbed on the necks and heads. Fowls in trying to destroy insects on other parts of the body will rub the disinfectant on various parts of the body. Remedies for curing "sorehead" of fowls can be placed in the tank 3 and applied in the same manner as a disinfectant.

Having fully described my invention, what I claim as new and desire to secure by Letters Patent, is,—

An automatic poultry disinfector comprising a screen inclosure having a plurality of openings, a supporting base, means in connection with said base for holding and exhibiting food, a fibrous distributer arranged about each one of said openings, a disinfectant containing tank and frame pieces in connection with said base for supporting said tank, a plurality of pipes connected with said tank and each pipe provided with a cock and adapted to saturate each fibrous distributer with disinfectant from said tank and a shield with each distributer to prevent the waste disinfectant from mixing with the food.

In testimony whereof, I set my hand in the presence of two witnesses, this 13th day of December, 1911.

JAMES W. DONATHAN.

Witnesses:
R. R. MULLEN,
B. ANDERSON.